Oct. 25, 1966     A. C. MILLER     3,281,188
EMERGENCY FLUID SYSTEMS AND COMPONENTS
Filed Oct. 12, 1964
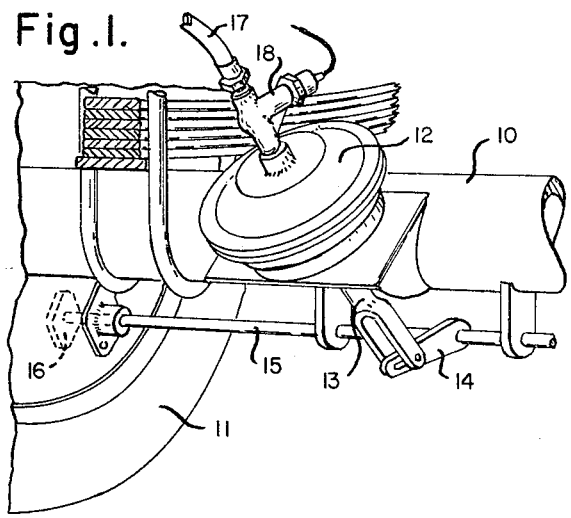
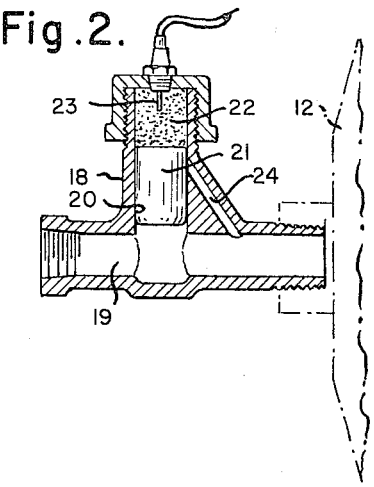
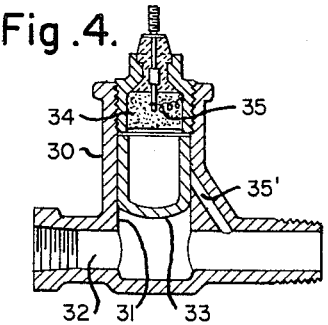
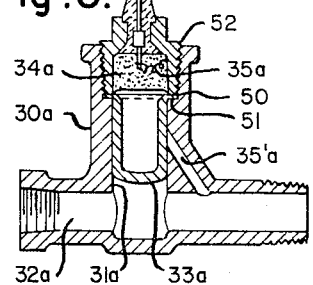
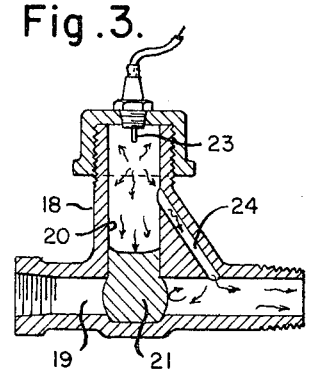
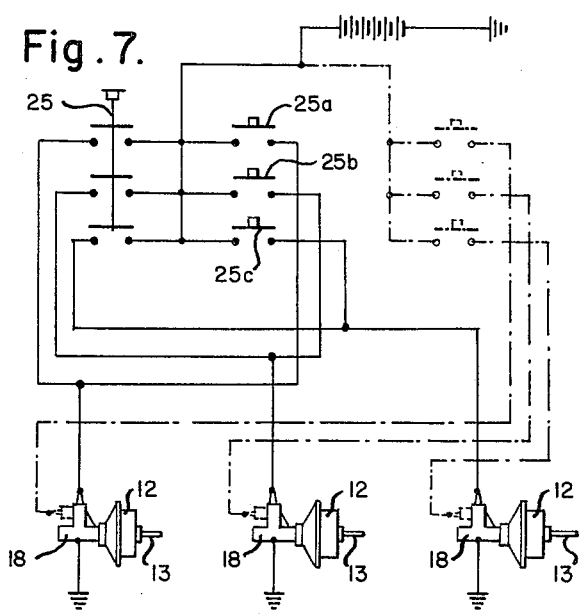
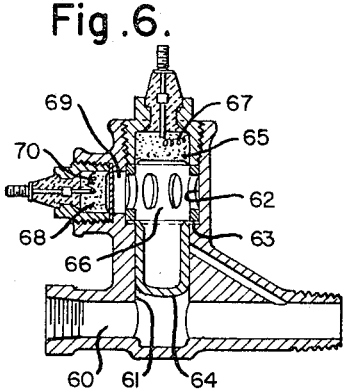
INVENTOR
Albert C. Miller

United States Patent Office 3,281,188
Patented Oct. 25, 1966

3,281,188
EMERGENCY FLUID SYSTEMS
AND COMPONENTS
Albert C. Miller, 1276 Justine St., Pittsburgh, Pa.
Filed Oct. 12, 1964, Ser. No. 403,280
5 Claims. (Cl. 303—2)

This invention relates to emergency fluid systems and components and particularly to an emergency brake system and valve structure. There are many fluid systems where it is desirable to be able to actuate a fluid motor in the event a break occurs between the fluid motor and its source of energizing fluid. Perhaps the best known such system is that used in the braking systems of motor vehicles and particularly trucks where a brake cylinder or diaphragm is operated by fluid from a pressure source. In such braking systems, it sometimes happens that the fluid which normally actuates the brake cylinder or diaphragm is lost through a break in a transmission line or for some other reason. The result is frequently a serious and costly accident.

I have invented an emergency fluid valve and system which solves the problem of supplying emergency fluid to a fluid motor while isolating said motor from its normal operating system.

In a preferred embodiment of my invention I provide in a fluid system having a fluid motor, a source of fluid under pressure for said motor and connections between said source and said motor, an emergency fluid valve comprising a housing, a first passage in said housing adapted to be inserted in the connection between the fluid motor and source of fluid and form a part thereof, a second passage transverse to and intersecting said first passage, a solid member in said second passage of such size that when forced into the first passage it serves to completely fill the section of such passage, a reactive mass in said second passage on the side of said solid member opposite the first passage, said reactive mass adapted to expand into multiples of its original volume when properly energized, a by-pass from the second passage to the fluid motor and actuator means for energizing the reactive mass whereby the solid member is forced into the first passage and the fluid motor is actuated through the by-pass by the expansion of the reactive mass. Preferably, the reactive mass is an explosive charge and the solid member is a lead or other deformable metal slug which is forced into and expanded to seal the first passage when the explosive charge is ignited. A plurality of such explosive charges might be provided to permit controlled increases in the pressure exerted by the explosion gases on the fluid motor.

In the foregoing general statement of my invention I have set out certain objects, purposes and advantages of my invention. Other objects, purposes and advantages will be apparent from a consideration of the following description and the accompanying drawings in which:

FIGURE 1 is an isometric view of a portion of an undercarriage of a vehicle having the system of this invention;

FIGURE 2 is a fragmentary section of an air diaphragm and emergency fluid system of my invention in the open position;

FIGURE 3 is a fragmentary section identical with FIGURE 2 but with the valve of the emergency system closed;

FIGURE 4 is a section through a second embodiment of my invention;

FIGURE 5 is a section through a third embodiment of my invention;

FIGURE 6 is a section through a fourth embodiment of my invention; and

FIGURE 7 is a schematic wiring diagram for actuating the system of my invention.

Referring to the drawings and particularly to FIGURES 1 through 3, I have illustrated an axle assembly 10 having a wheel 11. A pneumatic brake cylinder 12 is attached to axle 10. A piston 13 is reciprocably mounted within cylinder 12 and is connected at one end to a lever 14 fixed to brake actuating shaft 15 journalled beneath axle 10 and transmits braking motion to brake shoe cam 16 under pressure impulse from a source of pressure (air or hydraulic) delivered through line 17.

The emergency fluid system of this invention comprises a housing 18 having two transversely intersecting passages 19 and 20 in the form of a T. The passage 19 is connected between line 17 and cylinder 12 and forms a part of the fluid connection between the source of pressure fluid and the cylinder. The passage 20 is provided with a member 21 of lead or other malleable or slightly deformable material and an explosive charge 22 surrounding an electrode 23 connected to a source of high tension spark voltage. A by-pass 24 extends diagonally from a point intermediate passage 20 to a point adjacent the connection of passage 19 with the cylinder 12.

The device of this invention operates as follows. If a break occurs in line 17, the operator throws switch 25 which causes a spark to discharge from electrode 23 to the wall of housing 18 through explosive charge 22 in all emergency units. This causes the charge 22 to ignite forcing member 21 into passage 19 as shown in FIGURE 3 and opening by-pass 24. This seals passage 19 and the expanding gases from the explosive charge pass through by-pass 24 into cylinder 12 to actuate the brakes. The brakes are locked in position and cannot be released without replacing the entire emergency fluid assembly in housing 18. This is highly desirable as it prevents a vehicle which has been stopped in emergency from being moved without replacing the device 18.

If it is desired to operate the emergency brakes on any set of axles independently of the others, one switch 25a, 25b or 25c may be thrown (see FIG. 7).

In FIGURE 4, I have illustrated a second embodiment of my invention in which housing 30 is provided with transversely intersecting passages 31 and 32 as in FIGURES 1 and 2. A hollow deformable member of lead or the like 33 is provided in passage 31 along with explosive charge 34 and electrode 35 corresponding to member 21, charge 22 and electrode 23 of FIGURES 1–3. A by-pass 35' corresponding to by-pass 24 of FIGURES 1–3 is provided. Operation is similar to FIGURES 2 and 3.

In the embodiment illustrated in FIGURE 5, I have illustrated a structure substantially identical with that of FIGURE 4 and marked with like numerals identifying like parts but with the addition of the suffix (a). This embodiment differs from FIGURES 1–3 in having an enlarged bore 50 in passage 31a receiving lugs or flange 51 radially extending from slug 33a to hold it in position. The charge 34a is carried in a sleeve or case 52 fitting in bore 50. When the charge 34a is ignited, it ejects slug 33a with such force that lugs or flange 51 are sheared and slug 33a is then forced into position in passage 31a.

In FIGURE 6, I have illustrated an embodiment having intersecting passages 60 and 61 corresponding to 19 and 20 of FIGURES 1–3. Passage 61 has an enlarged bore 62 receiving lugs 63 radially extending from the top of a hollow slug 64. A primary charge 65 is placed in the top of bore 62 spaced from slug 64 by a perforate annular ring 66. A primary electrode 67 is provided for igniting charge 65. A secondary charge 68 is provided in a well 69 on the side of enlarged bore 62 together with an igniting electrode 70. The primary charge 65 is ignited as described in connection with FIGURES 1–3. In the event of a failure of charge 65 to ignite, the secondary charge 68 may be ignited. Alternatively, charge 68 may be ignited if additional operating pressure is needed on the brake operating cylinder or diaphragm. Such an auxiliary system is shown in chain line in FIGURE 7.

In the foregoing specification, I have illustrated and described certain preferred embodiments of my invention. It will be obvious, however, that this invention may be otherwise embodied within the scope of the following claims.

I claim:

1. In a fluid system having a fluid actuated member, a source of fluid under pressure spaced from said fluid actuated member and a connection between said fluid actuated member and source of fluid, the improvement comprising a housing, a first passage in said housing adapted to be inserted in the connection between the fluid actuated member and the source of fluid to form a part thereof, a second passage transverse to and intersecting said first passage, a non-resilient deformable sealing member in said second passage of such size that when forced into the first passage it serves to seal said passage, a reactive mass in said second passage adapted when energized to expand against said sealing member to force it into the first passage to permanently deform said sealing member in sealing relationship with said first passage, a by-pass from the second passage to said first passage at a point intermediate the fluid actuated member and the intersection of the first and second passages and actuator means for energizing the reactive mass whereby the sealing member is forced into the first passage and the fluid actuated member is actuated through the by-pass by the expansion of the reactive mass.

2. In a fluid brake system having a fluid actuated brake member, a source of fluid under pressure spaced from said brake member and a connection between said brake member and source of fluid, the improvement comprising a housing, a first passage in said housing adapted to be inserted in the connection between the brake member and the source of fluid to form a part thereof, a second passage transverse to and intersecting said first passage, a non-resilient deformable sealing member in said second passage of such size that when forced into the first passage it serves to seal said passage, an explosive charge in said second passage adapted when detonated to expand against said sealing member to force it into the first passage to permanently deform said sealing member in sealing relationship with said first passage, a by-pass from the second passage to said first passage at a point intermediate the brake member and the intersection of the first and second passages, said by-pass being normally closed by said sealing member in the first passage and opened by movement of said sealing member into the second passage and actuator means for detonating the explosive charge whereby the sealing member is forced into the first passage and the brake member is actuated through the by-pass by the explosion gases.

3. A brake system as claimed in claim 2 wherein at least one supplemental explosive charge is provided to discharge into said by-pass and means for detonating said supplemental explosive charge after the sealing member has been set in said first passage.

4. In a fluid brake system having a fluid actuated brake member, a source of fluid under pressure spaced from said brake member and a connection between said brake member and source of fluid, the improvement comprising a housing, a first passage in said housing adapted to be inserted in the connection between the fluid motor and the source of fluid to form a part thereof, a second passage transverse to and intersecting said first passage, a non-resilient deformable sealing member in said second passage of such size that when forced into the first passage it serves to seal said passage, a plurality of explosive charges in said second passage, at least one of which is adapted when detonated to expand against said sealing member to force it into the first passage to permanently deform said sealing member in sealing relationship with said first passage, a by-pass from the second passage to said first passage at a point intermediate the brake member and the intersection of the first and second passages, said by-pass being normally closed by said sealing member in the first passage and opened by movement of said sealing member into the second passage and means for selectively detonating the explosive charges whereby the solid member is forced into the first passage and the brake member is actuated through the by-pass by the explosion gases.

5. An emergency fluid pressure generator for use in a line connecting a source of fluid and a fluid actuated member comprising a housing, a first passage in said housing adapted to be inserted in the connection between the fluid actuated member and the source of fluid to form a part thereof, a second passage transverse to and intersecting said first passage, a non-resilient deformable sealing member in said second passage of such size that when forced into the first passage it serves to seal said passage, a reactive mass in said second passage adapted when energized to expand against said sealing member to force it into the first passage to permanently deform said sealing member in sealing relationship with said first passage, a by-pass from the second passage to said first passage at a point intermediate the fluid actuated member and the intersection of the first and second passages and actuator means for energizing the reactive mass whereby the sealing member is forced into the first passage and the fluid actuated member is actuated through the by-pass by the expansion of the reactive mass.

References Cited by the Examiner

UNITED STATES PATENTS

| 2,674,852 | 4/1954 | Olman | 303—2 |
| 2,891,818 | 6/1959 | Siano et al. | 303—2 |
| 2,922,498 | 1/1960 | Fleenor | 303—49 |
| 2,977,156 | 3/1961 | Di Gioia | 303—2 |

FOREIGN PATENTS 592,407   2/1960   Canada.

BENJAMIN HERSH, *Primary Examiner.*

EUGENE G. BOTZ, *Examiner.*

M. S. SALES, *Assistant Examiner.*